United States Patent
Narayanan et al.

(10) Patent No.: US 9,021,034 B2
(45) Date of Patent: Apr. 28, 2015

(54) INCORPORATING EXTERNAL EVENT INFORMATION INTO A SOCIAL NETWORKING SYSTEM

(75) Inventors: Srinivas P. Narayanan, San Francisco, CA (US); Devin James Naquin, San Francisco, CA (US); Justin Alexander Shaffer, Menlo Park, CA (US)

(73) Assignee: Facebook, Inc., Menlo Park, CA (US)

( * ) Notice: Subject to any disclaimer, the term of this patent is extended or adjusted under 35 U.S.C. 154(b) by 367 days.

(21) Appl. No.: 13/544,166

(22) Filed: Jul. 9, 2012

(65) Prior Publication Data

US 2014/0012925 A1    Jan. 9, 2014

(51) Int. Cl.
*G06F 15/16*     (2006.01)
*G06Q 50/00*     (2012.01)
*G06Q 10/10*     (2012.01)

(52) U.S. Cl.
CPC .............. *G06Q 50/01* (2013.01); *G06Q 10/109* (2013.01)

(58) Field of Classification Search
CPC ...... G06Q 50/01; G06Q 10/109; H04L 51/32; H04L 51/14; G06F 15/16
USPC ........ 709/204, 206, 218; 705/7.16, 7.19, 319; 707/759
See application file for complete search history.

(56) References Cited

U.S. PATENT DOCUMENTS

| | | | |
|---|---|---|---|
| 8,250,145 B2 | 8/2012 | Zuckerberg et al. | |
| 2007/0233736 A1* | 10/2007 | Xiong et al. | 707/104.1 |
| 2008/0098087 A1* | 4/2008 | Lubeck | 709/218 |
| 2009/0055236 A1* | 2/2009 | O'Sullivan et al. | 705/8 |
| 2009/0182589 A1* | 7/2009 | Kendall et al. | 705/5 |
| 2010/0325205 A1* | 12/2010 | Murphy et al. | 709/204 |
| 2011/0252097 A1* | 10/2011 | Walker et al. | 709/206 |
| 2012/0143964 A1* | 6/2012 | DeLuca et al. | 709/206 |
| 2012/0150581 A1* | 6/2012 | McPhail | 705/7.19 |
| 2012/0166532 A1 | 6/2012 | Juan et al. | |

* cited by examiner

*Primary Examiner* — Ario Etienne
*Assistant Examiner* — Kidest Mendaye
(74) *Attorney, Agent, or Firm* — Fenwick & West LLP

(57) ABSTRACT

A social networking system allows a user to create an event in the social networking system while viewing a web page from a third-party website from a domain different than the social networking system. A widget or other social plug-in is included in the web page, and user interaction with the widget communicates information from the web page to the social networking system. An event object is created in the social networking system from the information from the web page. The social networking system may perform various actions to increase user interaction with the created event object, such as identifying additional users to invite the event or identifying users attending the event to other users.

21 Claims, 6 Drawing Sheets

INCORPORATING EXTERNAL EVENT INFORMATION INTO A SOCIAL NETWORKING SYSTEM

BACKGROUND

This invention relates generally to social networking, and in particular to incorporating external event information into a social networking system.

In a typical social networking system, such as a social networking website, users set up their user profiles and then establish connections with other users of the social networking system. The users often provide information about themselves expressly to the social networking system, such as demographic information and/or a list of the users' interests. Users may also provide information about themselves implicitly to the social networking system, through their actions on the system and interactions with other users. In this way, a social networking system can obtain a rich set of social information about its users, which may be used to enhance a user's experience online.

Useful social information that is tracked and maintained by a social networking system can be thought of in terms of a "social graph," which includes a plurality of nodes that are interconnected by a plurality of edges. Each node in the social graph may represent something that can act on and/or be acted upon by another node. Common examples of nodes include users, non-person entities, content items, groups, events, messages, concepts, and any other things that can be represented by an object in a social networking system. An edge between two nodes in the social graph represents a particular kind of connection between the two nodes, which may result from an action that was performed by one of the nodes on the other node.

For example, if one user establishes a connection with another user in the social networking system, the two users are each represented as nodes, and the edge between the nodes represents the established connection. Continuing this example, one of these users may send a message to the other user within the social networking system. This act of sending the message is another edge between those two nodes, which can be tracked by the social networking system. The message itself may be treated as a node. Using the social graph, a social networking system may keep track of many different types of objects and the interactions and connections among those objects, thereby maintaining an extremely rich store of socially relevant information.

However, users frequently interact with content outside of the social networking system, such as content presented by third-party websites external to the social networking system. Often, a user may desire to communicate this interaction with external content back to the social networking system or use attributes of the external content for objects within the social networking system. For example, a social networking system may access a web page for an event, such as a concert or sporting event, and wish to coordinate with other social networking system users to attend the event. Currently, the user would need to manually create an event within the social networking system based on the event information from the web page, requiring the user to enter information about the event and identify other users to invite to the event. Hence, rather than leverage information about an event from sources external to the social networking system, conventional systems require a user to reproduce the information about the event in the social networking system to leverage the social networking system's functionality.

SUMMARY

To enable users of a social networking system to more easily create events using information external to the social networking system, information about an event is received and used by the social networking system to create an event inside the social networking system. In particular, information describing an event and used to create an event object within the social networking system is obtained from a web page (or anything represented by a URL, URI, or any other address on the Internet or other network), which may be outside of the domain of the social networking system, and used to generate the event object. Additionally, the information describing the event may be provided by any suitable entity outside of the domain of the social networking system, such as an application executing on a user device. Once the event object is established in the social networking system it is used as a node in a social graph maintained by the social networking system and other social networking system users may be invited to the event or otherwise be notified of the event. For example, an inviting user creates an event object by communicating a time, a location and/or a description from a third-party website to the social networking system, allowing the inviting user to more easily create the event and invite users to the event.

In one embodiment, a web page provided by a third-party website, which is in a different domain than the social networking system, includes a social plug-in that communicates information from the web page to the social networking system, in response to input from a user, which is incorporated into the social networking system. For example, an iframe included in the web page allows communication of data from the web page to the social networking system. An action button may be included in the iframe, so data is communicated to the social networking system when the user interacts with the action button. Based on the data from the web page, the social networking system generates and stores an object that is maintained by the social networking system. The data communicated to the social networking system may describe an event, allowing interaction with the social-plug in on the web page to create an event within the social networking system. For example, a time, location, name and/or description of the event is provided from the web page on the third-party website to the social networking system.

Hence, a user may interact with a social plug-in, such as an action button presented within a frame on a web page of a third-party website, to create an event within the social networking system. The third-party website need not know information was communicated to the social networking system or the identity of the user communicating information to the social networking system. In another embodiment, the web page including information about the event is encoded by a markup language document, which a web browser application can use to render and display the web page on a user device. The markup language document includes one or more tags including meta-information about the event. For example, the tags include a time for an event, a location for the event, a title for the event and/or other information about the event. Responsive to user interaction with the social-plug in, the social networking system retrieves the tags from the markup language document and stores their information in the social networking system as an event object. This allows the social networking system to generate an event object, and a corresponding node in the social graph representing the event in the social networking system directly from information in the web page.

Once the action to create an event is taken by the user, the social networking system can react just as if the user were interacting with an event created within the social networking system. For example, the social networking system may update a profile associated with the user to include an association with the event, post information about the event to the user's connections or perform other actions relating to the event. After the event is created in the social networking system, additional actions may be performed by the social networking system to increase user interaction with the event.

After an event is defined in the social networking system, social networking system users are able interact with the event in a variety of ways. For example, users may accept an invitation to the event, comment on the event, invite other users to the event or perform other actions associated with the event. The social networking system may also suggest additional users to invite to the event based on the probability that the additional users will attend the event. Further, the social networking system may notify invited users that have not accepted an invitation to the event that certain users, to whom the non-accepting user has a high affinity, have accepted invitations. This allows the social networking system to encourage users to attend the event. Similarly, the social networking system may differently respond to user responses accepting an invitation to the event and declining an invitation to the event to promote attending the event.

The Figures depict various embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

Overview

Figure 1:
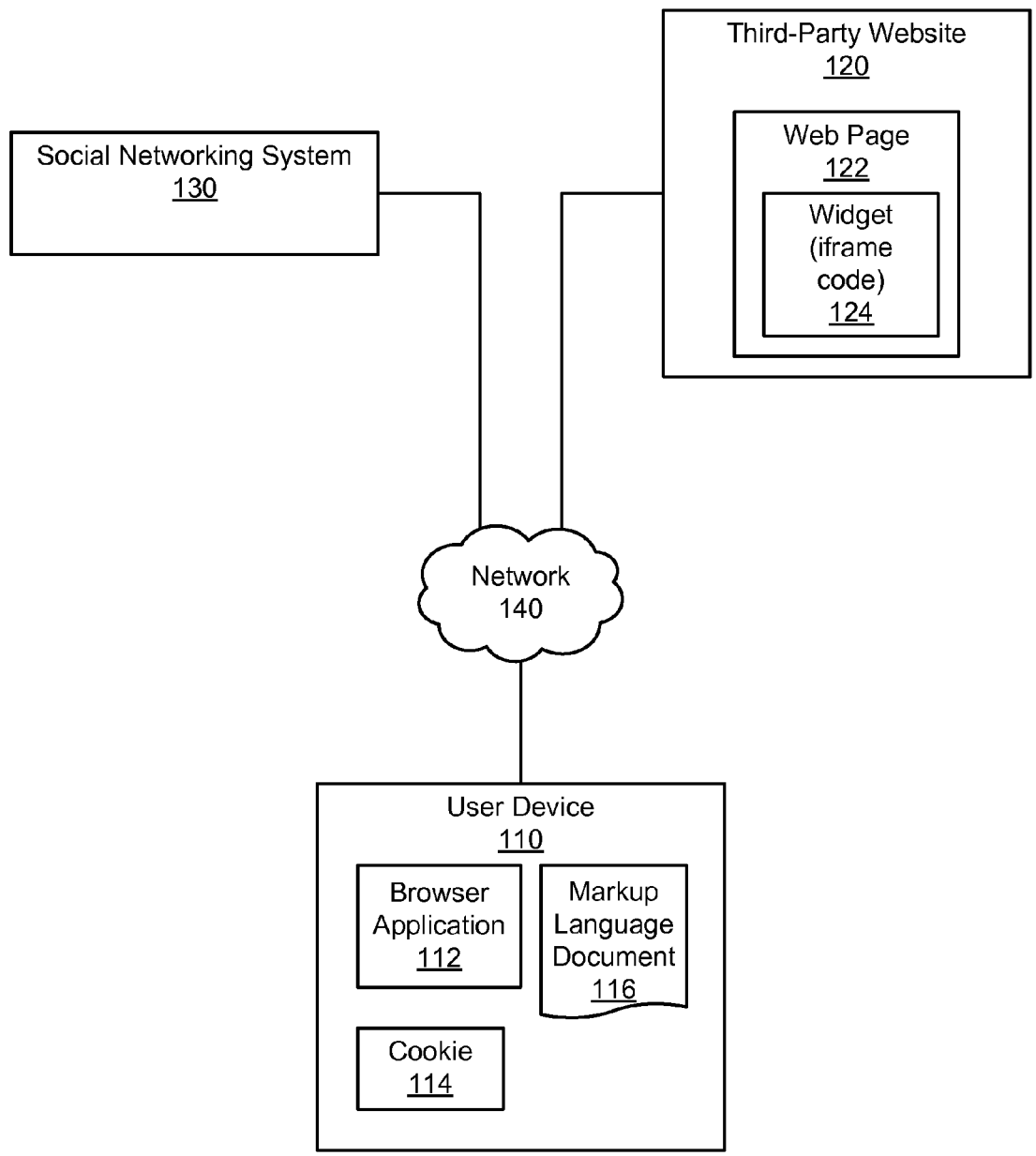
FIG. 1 is a network diagram of a system environment for providing event information from a third-party website to a social networking system, in accordance with an embodiment of the invention.

FIG. 1 is a network diagram of one embodiment of a system environment 100 used to define create an event in a social networking system using information from a web page associated with a domain different from the social networking system domain (i.e., a "third-party" website). The system environment 100 of includes one or more user devices 110, one or more third-party websites 120, the social networking system 130 and a network 140. For purposes of illustration, the embodiment of the system environment 100 shown by FIG. 1 includes a single third-party website 120 and a single user device 110. However, in other embodiments, the system 100 may include more user devices 110 and/or more third-party websites 120. In certain embodiments, the social networking system 130 is operated by a social network provider, whereas the third-party websites 120 are operated by entities different from the social network provider. In various embodiments, however, the social networking system 130 and the external websites 120 operate in conjunction to provide social networking services to users of the social networking system 130.

The user device 110 comprises one or more computing devices that can receive input from a user and can transmit and receive data via the network 140. For example, the user device 110 may be a desktop computer, a laptop computer, a smart phone, a personal digital assistant (PDAs) or any other device including computing functionality and data communication capabilities. The user device 110 is configured to communicate with the third-party website 120 and the social networking system 130 via the network 140, which may comprise any combination of local area and/or wide area networks, using both wired and wireless communication systems.

In one embodiment, the user device 110 displays content from the third-party website 120 or from the social networking system 130 by processing a markup language document 116 received from the third-party website 120 or from the social networking system 130 using a browser application 112. The markup language document 116 identifies content and one or more instructions describing formatting or presentation of the content. By executing the instructions included in the markup language document 116, the browser application 112 displays the identified content using the format or presentation described by the markup language document 116. For example, the markup language document 116 includes instructions for generating and displaying a web page having multiple frames that include text and/or image data retrieved from the third-party website 120 and/or the social networking system 130. In various embodiments, the markup language document 116 comprises a data file including extensible markup language (XML) data, extensible hypertext markup language (XHTML) data or other markup language data.

In one embodiment, the user device 110 also includes a cookie 114 including data indicating whether a user of the user device 110 is logged into the social networking system 130. The cookie 114 indicates whether the user of the computing device 110 is involved in an active session where the user device 110 exchanges data with the social networking system 130, allowing modification of the data communicated from the social networking system 130 to the user device 110.

The third-party website 120 comprises one or more web servers including one or more web pages 122, which are communicated to the user device 110 using the network 140. The third-party website 120 is separate from the social networking system 130. For example, the third-party website 120 is associated with a first domain while the social networking website is associated with a separate social networking domain. A web page 122 included in the third-party website 120 comprises a markup language document identifying content and including instructions specifying formatting or presentation of the identified content.

The markup language document 116 includes one or more tags including meta-information associating the web page 122 represented by the markup language document 116 with a node in the social networking system 130, which are further described below. The tags may provide textual titles, labels, and/or descriptions about the node in the social networking system 130, as well as other information, such as a title, label, unique identifier, micro format, and/or descriptions about the node, as well as other information, such as the type of the node. For example, the tags identify a title, location, time and description of an event, allowing the social networking system 130 to create an event object and a note associated with the event object based on the information within the markup language document 116 comprising a web page 122. As the web page 122 may be maintained by an external website 120 that is outside of the domain of the social networking system 130 and may be operated by an entity other than an operator of the social networking system 130, the tags in the markup language document 116 allow external websites 120 to define, create, and maintain events, and their corresponding nodes, used by the social networking system 130, as further described below.

In one embodiment, a web page 122 includes a widget 124 comprising instructions that, when executed by a browser application 112 of a user device 110, retrieve data from the web page 122 and communicate the data to the social networking system 130. Based on the data from the web page 122, the social networking system 130 defines and maintains an object associated with the event, or an "event object" based on information received from the third-party website. The event object is associated with a corresponding node in a social graph maintained by the social networking system (an "event node") social networking system 130 and display the information retrieved from the social networking system 130.

The widget 124 may comprise an instruction associated with the social networking system 130 that generates a frame within the web page 122 that includes information from the social networking system 130. Hence, the widget 124 allows a web page 122 from the external website 120 to receive information from the social networking system 130 when the web page 122 is rendered and displayed by a browser application 112 of a user device 110 and to communicate data from the web page 122 to the social networking system 130. The widget 124 also allows a user to interact with content from the social networking website 130 by interacting with content in the frame generated within the web page 122. For example, the widget 124 may also allow users of the social networking system 130 to invite other users to the event, post the event to a newsfeed, comment on the event, or perform other actions related to the event while viewing the web page 122 from the third-party website 120.

The social networking system 130 comprises one or more computing devices storing a social network, or a social graph, comprising a plurality of users and providing users of the social network with the ability to communicate and interact with other users of the social network. The social networking system 130 is further described below in conjunction with FIG. 2. In use, users join the social networking system 130 and then add connections to a number of other users of the social networking system 130 to whom they desire to be connected. As used herein, the term "friend" refers to any other user of the social networking system 130 to whom a user has formed a connection, association, or relationship via the social networking system 130.

The social networking system 130 also allows users to create events, which include a time, location and list of users invited to the event. Additional information, such as a title, a description, photographs, images, videos or other data may also be associated with, or included in, an event. In an embodiment, the social networking system 130 creates and maintains an object associated with an event, which is used as a node in a social graph. This allows users, or other objects, to form connections with an event. In addition to creating an event, the social networking system 130 may use information about its users to identify additional users to invite to the event or to encourage attendance to the event by modifying presentation of data associated with the event to various users. Modification of information about the event presented to users and identification of additional users to invite to the event is further described below in conjunction with FIGS. 3-5.

Connections between users and/or other objects may be added explicitly by a user or may be automatically created by the social networking systems 130 based on common characteristics of the users (e.g., users who are alumni of the same educational institution). For example, a first user specifically selects a particular other user to be a friend. Connections in the social networking system 130 are usually in both directions, but need not be, so the terms "user" and "friend" depend on the frame of reference. Connections between users of the social networking system 130 are usually bilateral, or "mutual," but connections may also be unilateral, or "one-way." For example, if Bob and Joe are both users of the social networking system 130 and connected to each other, Bob and Joe are each other's connections. If, on the other hand, Bob wishes to connect to Joe to view data communicated to the social networking system by Joe but Joe does not wish to form a mutual connection, a unilateral connection may be established. The connection between users may be a direct connection; however, some embodiments of a social networking system allow the connection to be indirect via one or more levels of connections or degrees or separation.

In addition to establishing and maintaining connections between users and allowing interactions between users, the social networking system 130 provides users with the ability to take actions on various types of items supported by the social networking system 130. These items may include groups or networks (where "networks" here refer not to physical communication networks, but rather social networks of people, entities, and concepts) to which users of the social networking system may belong, events or calendar entries in which a user might be interested, computer-based applications that a user may use via the social networking system 130, transactions that allow users to buy or sell items via the service, and interactions with advertisements that a user may perform on or off the social networking system. These are just a few examples of the items upon which a user may act on a social networking system, and many others are possible. A user may interact with anything that is capable of being represented in the social networking system 130 or in a third-party website 120, separate from the social networking system 130, coupled to the social networking system 130 via a network 140.

The social networking system 130 is also capable of linking a variety of entities. For example, the social networking system 130 enables users to interact with each other as well as third-party websites 120 or other entities through an API or other communication channels. Thus, the social networking system 130 generates and maintains a "social graph" comprising a plurality of nodes interconnected by a plurality of edges. Each node in the social graph may represent an entity that can act on another node and/or that can be acted on by another node. The social graph may include various types of nodes. Examples of types of nodes include users, non-person entities, content items, web pages, groups, events, messages, concepts, and any other things that can be represented by an object in the social networking system 130. An edge between two nodes in the social graph represents a particular kind of connection between the two nodes, which may result from an action that was performed by one of the nodes on the other node. For example, when a first user identifies a second user as a friend, an edge in the social graph is generated connecting a node representing the first user and a second node representing the second user. As various nodes interact with each other, the social networking system 130 modifies edges connecting the various nodes to reflect the interactions.

The social networking system 130 also includes user-generated content, which enhances a user's interactions with the social networking system 130. User-generated content may include anything a user can add, upload, send, or "post," to the social networking system 130. For example, a user communicates posts to the social networking system 130 from a user device 100. Posts may include data such as status updates or other textual data, location information, photos, videos, links, music or other similar data and/or media. Content may also be added to the social networking system 130 by a third-party through a "communication channel," such as a newsfeed or stream. Content "items" represent single pieces of content that are represented as objects in the social networking system 130. In this way, users of the social networking system 130 are encouraged to communicate with each other by posting text and content items of various types of media through various communication channels, increasing the interaction of users with each other and increasing the frequency with which users interact with the social networking system 130.

Social Networking Architecture

Figure 2:
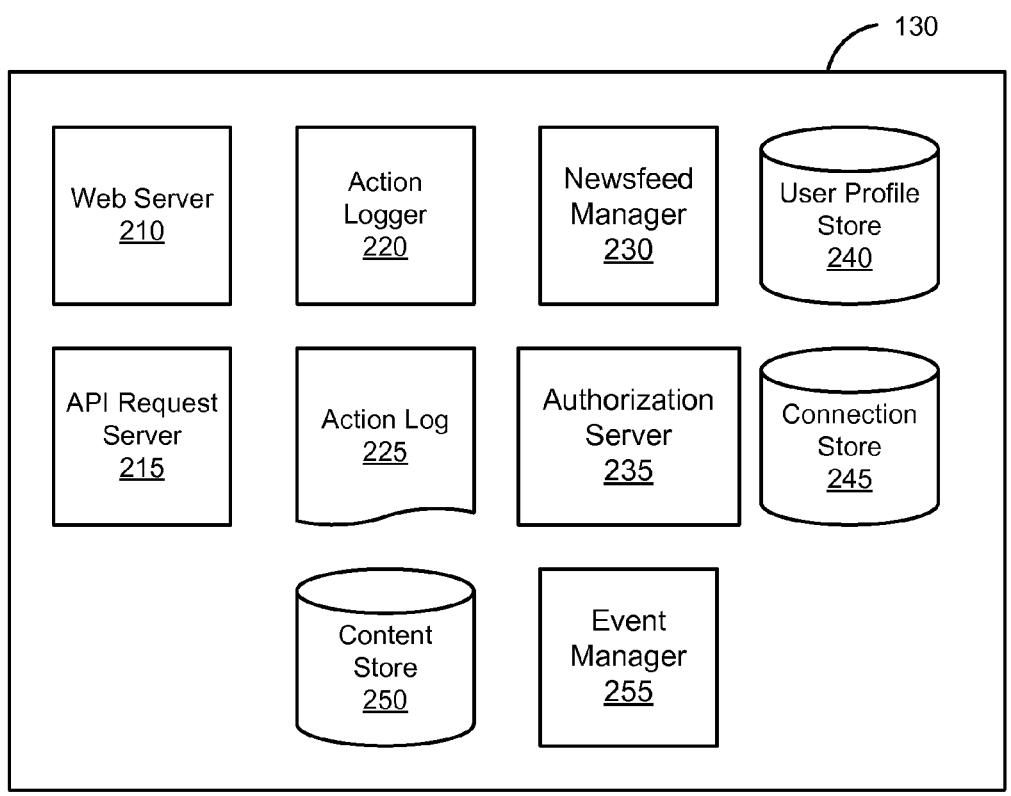
FIG. 2 is a diagram of a social networking system, in accordance with an embodiment of the invention.

FIG. 2 is a diagram of one embodiment of a social networking system 130. The example social networking system 130 shown by FIG. 2 includes a web server 210, an API request server 215, an action logger 220, an action log 225, a newsfeed manager 230, an authorization server generator 235, a user profile store 240, a connection store 245, a content store 250 and an event manager 255. In other embodiments, the social networking website 130 may include additional, fewer, or different modules for various applications. Conventional components such as network interfaces, security mechanisms, load balancers, failover servers, management and network operations consoles, and the like are not shown so as to not obscure the details of the system.

As described above in conjunction with FIG. 1, the social networking system 130 comprises a computing system that allows users to communicate or otherwise interact with each other and access content as described herein. The social networking system 130 stores user profiles describing the users of a social network and objects describing other content included in the social network. The user profiles include biographic, demographic, and other types of descriptive information, such as work experience, educational history, hobbies or preferences, location, and the like. The social networking system 130 also allows users to create events specifying a time and a location where a group of users invited to the event meet. For example, an inviting user creates an event and the social networking system 130 sends invitations to the event to users identified by the inviting user.

The social networking system 130 further stores data describing one or more connections between different users in the connection store 245. The connection information may indicate users who have similar or common work experience, group memberships, hobbies, or educational history. Additionally, the social networking system 130 includes user-defined connections between different users, allowing users to specify their relationships with other users. For example, user-defined connections allow users to generate relationships with other users that parallel the users' real-life relationships, such as friends, co-workers, partners, and so forth. Users may select from predefined types of connections, or define their own connection types as needed.

The web server 210 links the social networking system 130 to one or more user devices 110 and/or to one or more third-party websites 120 via the network 140. The web server 210 serves web pages, as well as other web-related content, such as JAVA®, FLASH®, XML, and so forth. The web server 210 may include a mail server or other messaging functionality for receiving and routing messages between the social networking system 130 and one or more user devices 110. The messages can be instant messages, queued messages (e.g., email), text and SMS messages, or any other suitable messaging format.

The Application Programming Interface (API) request server 215 allows one or more third-party websites 120 to access information from the social networking system 130 by calling one or more APIs. The API request server 215 may also allow third-party websites 120 to send information to the social networking website 130 by calling APIs. For example, an external website 120 sends an API request to the social networking system 130 including information describing an event via the network 140 and the API request server 220 receives the API request. The API request server 220 processes the request by calling an API associated with the API request to generate an object, and a corresponding node, using the information describing the event.

The action logger 220 is capable of receiving communications from the web server 210 about user actions on and/or off the social networking system 130. The action logger 220 populates the action log 225 with information about user actions, allowing the social networking system 130 to track various actions taken by its users within the social networking system 130. Any action that a particular user takes with respect to another user is associated with each user's profile, through information maintained in the action log 225 or in a similar database or other data repository. Examples of actions taken by a user within the social networking system 130 that are identified and stored may include, for example, adding a connection to another user, sending a message to another user, reading a message from another user, viewing content associated with another user, attending an event posted by another user, or other actions interacting with another user. When a user takes an action within the social networking system 130, the action is recorded in the action log 225. In one embodiment, the social networking system 130 maintains the action log 225 as a database of entries. When an action is taken within the social networking system 130, an entry for the action is added to the action log 225.

Additionally, user actions may be recorded even when taken outside of the social networking system 130, such as a user interaction with the third-party website 120 that is separate from the social networking system 130. For example, the action logger 220 receives data describing a user's interaction with the third-party website 120 from the web server 210. Examples of actions where a user interacts with the third-party website 120 include a user expressing an interest in the third-party website 120 or another entity, a user posting a comment to the social networking system 130 that discusses the third-party website 120 or the web page 122 within the third-party website 120, a user posting to the social networking system 130 a Uniform Resource Locator (URL) or other identifier associated with the third-party website 120, a user attending an event associated with the third-party website, 120 or any other action by a user that is related to the third-party website 120. Thus, the action log 225 may include actions describing interactions between a social networking system user and the third-party website 120 separate from the social networking system 130.

The news feed manager 230 selectively provides content to users of the social networking system 130 and records the consumption of content by users. In one embodiment, the news feed manager 230 generates stories for a user describing actions taken by other members of the social networking system 130 to whom the user is connected. In one example, the news feed generated by the news feed manager 230 for a user includes comments made by other users to whom the user is connected. In another example, the news feed generated includes content posted to the social network system 130 by other social networking system users to whom the user is connected or other actions taken by other users to whom the user is connected. As another example, a generated news feed identifies an event created by a social networking system user, such as an event created using a social plug-in included on a web page from a third-party website 120. New news feed stories generated for a user by the news feed manager 230 may be ranked and stored by the social networking system 130. The news feed manager 230 may communicate with the client devices 110 through the network 140 to provide content to users of the social networking system 130.

The authorization server 235 enforces one or more privacy settings of the users of the social networking system 130. A privacy setting of a user determines how particular information associated with a user can be shared. The privacy setting comprises the specification of particular information associated with a user and the specification of the entity or entities with whom the information can be shared. Examples of entities with which information can be shared may include other users, applications, third-party websites 120 or any entity that can potentially access the information. The information that can be shared by a user comprises user profile information like profile photo, phone numbers associated with the user, user's connections, actions taken by the user such as adding a connection, changing user profile information and the like.

The privacy setting specification may be provided at different levels of granularity. For example, the privacy setting may identify specific information to be shared with other users. For example, the privacy setting identifies a work phone number or a specific set of related information, such as, personal information including profile photo, home phone number, and status. Alternatively, the privacy setting may apply to all the information associated with the user. The specification of the set of entities that can access particular information can also be specified at various levels of granularity. Various sets of entities with which information can be shared may include, for example, all friends of the user, all friends of friends, all applications, all third-party websites 120 or all external systems. One embodiment allows the specification of the set of entries comprise an enumeration of entities, for example, the user may provide a list of third-party websites 120 that are allowed to access certain information. Another embodiment allows the specification to comprise a set of entities along with exceptions that are not allowed to access the information. For example, a user may allow all third-party websites 120 to access the user's work information but specify a list of third-party websites 120 that are not allowed to access the work information. Certain embodiments call the list of exceptions that are not allowed to access certain information a block list. External systems, such as third-party websites 120, belonging to a block list specified by a user are blocked from accessing the information specified in the privacy setting. Note that the various combinations of granularity of specification of information and the granularity of specification of entities with which information is shared are possible, i.e., all personal information may be shared with friends whereas all work information may be shared with friends of friends.

The authorization server 235 includes logic for determining if certain information associated with a user can be accessed by a user's friends, third-party websites 120 and/or other applications and entities. For example, a third-party website 120 that attempts to access a user's comment about a URL associated with the third-party website 120 must get authorization from the authorization server 235 to access the user's work phone number. Based on the user's privacy settings, the authorization server 235 determines if another user, a third-party website 120, an application or another entity is allowed to access information associated with the user, including information about actions taken by the user. For example, the authorization server 235 uses a users privacy setting to determine if the user's comment about a URL associated with the third-party website 120 can be accessed by the third-party website 120. This enables a user's privacy setting to specify which other users, or other entities, are allowed to receive data about the user's actions or other data associated with the user.

The social networking system 130 maintains a user profile for each of its users and stores the user profiles in the user profile store 240. A user profile includes declarative information about the user that was explicitly shared by the user, and may also include profile information inferred by the social networking system 130. In one embodiment, a user profile includes multiple data fields, each data field describing one or more attributes of the corresponding user of the social networking system 130. A user profile may include a variety of types of data, such as biographic, demographic, and other types of descriptive information, such as work experience, educational history, gender, hobbies or preferences, location and the like. A user profile may also store other information provided by the user, for example, images or videos. In certain embodiments, images of users may be tagged with identification information of users of the social networking system 130 displayed in an image. A user profile in the user profile store 240 may also maintain references to actions by the corresponding user performed on content items in the content store 250 and stored in the action log 225.

A user profile object for a user may also include the user's affinity scores for objects in the social networking system 130. An affinity score measures or indicates a user's affinity for an object in the social networking system 130. In one embodiment, affinity scores of users for an object may be determined by the social networking system 130 based on the user's interactions with the specified object over time. In particular, affinity scores of the users for an object may be determined based on edge objects containing information describing the interactions between the user and object. Example embodiments of computing affinity scores are described in a related application, "Contextually Relevant Affinity Prediction in a Social Networking System," U.S. patent application Ser. No. 12/978,265, filed on Dec. 23, 2010, which is hereby incorporated by reference in its entirety.

The content store 250 stores content objects. A content object may include any type of object on the social networking system 130, such as a page post, a status update, a photo, a video, a link, a shared content item, a gaming application achievement, a check-in event at a local business, and so on. Content objects include objects created by users of the social networking system 130, such as status updates that may be associated with photo objects, location objects, and other users, photos tagged by users to be associated with other objects in the social networking system 130. Additional examples of content objects include events, pages, and other users, and applications installed on the social networking system 130. Information used to create a content object may be obtained from sources external to the social networking system 130, such as a third-party website 120. For example, responsive to user interaction with a widget 124 included in a web page from a third-party website 120, the social networking system 130 receives data describing an event and generates an object for the event that is stored in the content store 250. Hence, content objects or data for generating content objects may be received from third-party applications or third-party applications separate from the social networking system 130. Content "items" represent single pieces of content that are represented as objects in the social networking system 130. In this way, users of the social networking system 130 are encouraged to communicate with each other by posting text and content items of various types of media through various communication channels, increasing the interaction of users with each other and increasing the frequency with which users interact within the social networking system 130.

In one embodiment, the content store 250 describes objects by maintaining instances of types corresponding to objects maintained by the social networking system 130. Each object type has information fields that are suitable for storing information appropriate to the type of object. For example, the content store 250 contains data structures with fields suitable for describing an event. When a new object of a particular type is created, the social networking system 130 initializes a new data structure of the corresponding type, assigns a unique object identifier to it, and begins to add data to the object as needed. This might occur, for example, when data describing an event is received from a user, a new instance of an event object is generated in the content store 250, a unique identifier is assigned to the event object or information from the user or from a web page begins to populate fields of the event object.

The connection store 245 includes data structures suitable for describing a user's connections to other users, connections to third-party websites 120, or connections to other objects. The connection information may indicate users who have similar or common work experience, group memberships, hobbies, or educational history. As another example, the connection information may indicate users invited to an event and/or users planning to attend an event. Additionally, the social networking system 130 includes user-defined connections between different users, allowing users to specify their relationships with other users. For example, user-defined connections allow users to generate relationships with other users that parallel the users' real-life relationships, such as friends, co-workers, partners, and so forth. Users may select from predefined types of connections, or define their own connection types as needed.

Data stored in the connection store 245, the user profile store 240, the content store 250 and the action log 225 allows the social networking system 130 to generate a social graph that identifies relationships between different users and/or social objects. An edge between two nodes in the social graph represents a particular kind of connection between the two nodes, which may result from an action that was performed by one of the nodes on the other node. The nodes in the social graph correspond to user profiles or objects with the edges between the nodes representing connections or other relationships between the content associated with the nodes.

For example, if a first user establishes a connection with a second user in the social networking system 130, user profiles of the first user and the second users from the user profile store 240 may act as nodes in the social graph. The connection between the first user and the second user stored by the connection store 245 is an edge between the nodes associated with the first user and the second user. Continuing this example, the second user may then send the first user a message within the social networking system 130, which is identified by the action logger 220 and stored in the action log 225. The stored action of sending the message is another edge between the two nodes in the social graph representing the first user and the second user. Additionally, the message itself may be identified from the action log 225 and included in the social graph as another node connected to the nodes representing the first user and the second user.

The event manager 255 identifies additional social networking system users for inviting to an event created by an inviting user. As described herein, the inviting user may create the event by interacting with a social plug-in or with other data included on a web page from a third-party website 120. In one embodiment, the event manager 255 accesses the user profile store 240 and the connection store 245 to identify candidate users who are connected to the inviting user that are not already invited to the event. A variety of factors may be used to select a set of candidate users. For example, the set of candidate users includes users connected to the inviting user that are not invited to the event but are within a specified distance of the event's location or users connected to the inviting user within a specified distance of the event's location and available at the time of the event. Hence, the event manager 255 may filter the users connected to the viewing user and not invited to the event based on their proximity to the event and/or their availability at the time of the event to select the set of candidate users. In other embodiments, the event manager 255 may use other attributes of the users connected to the inviting user and the event to select the set of candidate users.

The event manager 255 also uses affinity scores from the user profile store 240 or from the connection store 245 between the inviting user and various candidate users, as well as other factors to determine the probability that different candidate users would join the event if notified of it. For example, the event manager 255 accesses the user profile store 205 to determine the geographic location of a candidate user or to determine the availability of a candidate user during the time of the event. To identify candidate users most likely to attend the event, the event manager 255 may account for the distance between a candidate user and the event's location in addition to affinity score, so candidate users within a threshold distance of the event's location are selected.

Hence, the probability of a candidate user joining an event may be based on various factors, such as the availability of candidate users at the time of the event, the proximity of candidate users to the event location, the affinity scores between candidate users and the inviting user as well as other suitable factors. The event manager 255 may use additional information from the user profile store 240, the action log 225, and/or the connection store 245 in determining the probability that a candidate user will accept an invitation to an event. For example, the event manager 255 determines shared interests between the inviting user and a candidate user based on information in the user profiles for the respective users and/or actions taken by the users. The event manager 255 may determine that a candidate user with a number of types of interests in common with the inviting user is likely to attend an event that the inviting user created or is attending. As another example, the event manager 255 estimates a candidate user's probability of accepting an invitation to the event based on prior actions by a candidate user relating to events with similar attributes. For example, a candidate user that has joined events created by the inviting user, has joined events that the inviting user has also attended, has joined events at the same location as the event and/or has joined events with similar themes or interest may be determined to have a higher probability of accepting an invitation to the event.

In another embodiment, event manager 255 determines the probability that the inviting user would send an invitation to a candidate user if the candidate user was suggested to the inviting user. This probability may also be based on the inviting user's affinity for the candidate user as well as other factors, as described above. Alternatively, the event manager 255 determines the probability that the inviting user would send an invitation to a candidate user if suggested and the probability that the candidate user would join the event upon receiving an invitation; for example, the event manager 255 identifies candidate users based on the product of the probability that the inviting user would send an invitation to the candidate user and the probability that the candidate user would accept the invitation.

Other data may be used by the event manager 255 to determine the probability that candidate users would attend an event. Additional examples of data include a level of interaction between the inviting user and a candidate user, a number of users connected to both the inviting user and to a candidate user, a similarity of interests or other user profile information of the inviting user and the candidate user, a degree of separation between the inviting user and a candidate user or other information indicating an affinity between the inviting user and a candidate user.

In some embodiments, the event manager 255 associates a social value with each candidate user representing the social influence of each candidate user. This "social influence" may represent the likelihood that additional users will join an event that a candidate user joins. Hence, the social value allows identification of users whose attendance to an event increases the likelihood that additional users attend the event. For a candidate user, this value may be based on a number of factors including: the number of connections to other users or objects associated with the candidate user, the type of connections the candidate user has to other users or objects, a frequency that other users accept invitations from the candidate user, number of interactions between other users and the candidate user, as well as other factors. Using the social values associated with different candidate users, the event manager 255 determines an expected value for different candidate users based on their social value and the probability that they accept an invitation to the event. Candidate users having the highest expected values or having expected values equaling or exceeding a threshold value are suggested by the event manager 255 to the inviting user.

Additionally, the event manager 255 may receive responses to invitations to events from users and manage communication of those responses to additional users. In one embodiment, the event manager 255 identifies users invited to an event but that have not responded to the event invitation and notifies those users of how other users have responded to the event invitation. For example, the event manager 225 identifies users with a high affinity to a user that has not responded to an event invitation and notifies the non-responding user when those users accept an invitation to the event. This allows the event manager 255 to increase the likelihood that a user will accept an invitation to an event by notifying the user when other users to whom the user has a strong social connection or relationship attend the event. This is further described below in conjunction with FIG. 3.

In another embodiment, the event manager 255 notifies social networking system distributes users' responses to an event invitation based on how the different users respond to the invitation. For example, the event manger 255 identifies responses accepting an event invitation on a page associated with the event, allowing users to readily identify other users attending the event. Rather than identify responses declining the event invitation on the page, the event manager may prompt a user declining the event invitation to provide a message to the user from which the event invitation originated. Hence, responses declining an event invitation are not readily accessible to multiple social networking system users, but are communicated to the user initiating the sending of the event invitation. Modification of the distribution of event invitation responses is further described below in conjunction with FIG. 4.

Creation and Enhancement of Social Networking System Events

Figure 3:
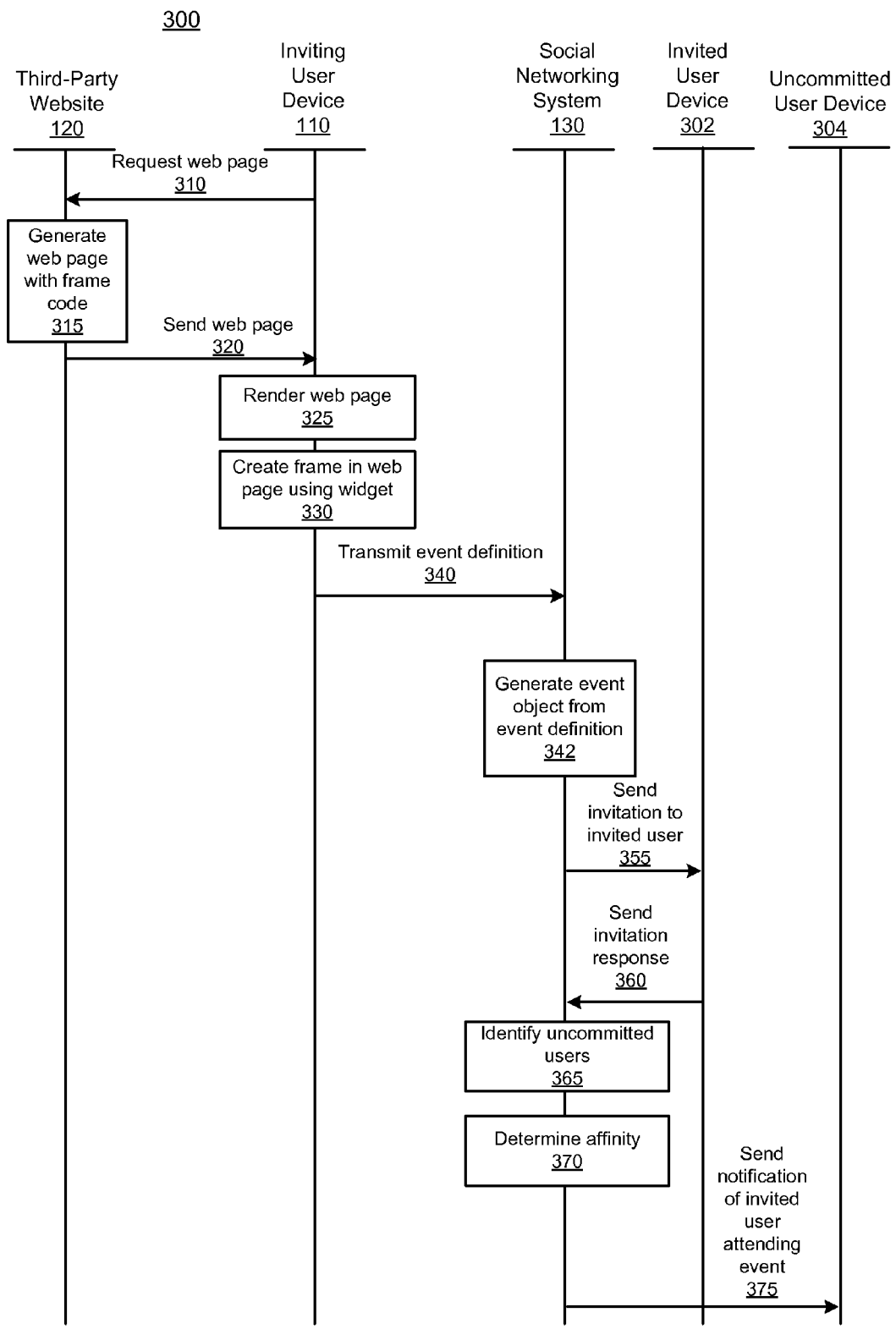
FIG. 3 is an interaction diagram of a method for notifying a social networking system user of other users attending an event created from a third-party website, in accordance with an embodiment of the invention.

FIG. 3 is an interaction diagram of a method for notifying a social networking system user of other users attending an event created from a third-party website 120. using information stored in the social networking system regarding the relationship between the various invitees, to encourage users having not responded to an invitation ("uncommitted users") to respond. Initially, a user device 110 requests 310 a web page 122 from the third-party website 120. For example, a user of the user device 110 enters a uniform resource locator (URL) or other identifier associated with the web page 122 into a browser application 112 operating on the user device 110. The browser application 112 identifies the third-party website 120 associated with the received URL or other identifier and requests 310 a web page 122 associated with the received URL or other identifier from the identified third-party website 120.

After receiving the request for the web page 122, the third party website 120 generates 315 the web page 122 from locally stored data. For example, the generated web page describes the content and formatting of data included the web page 122 in a markup language document 116. The generated web page includes also includes a widget 124, which is instructions that retrieve data from the web page 122 and communicate the data to the social networking system 130 when executed by the user device 110. More specifically, when executed by the user device 110 the widget 124 retrieves data from the web page 122 and communicates the retrieved data to the social networking system 130 describing an event. The web page 122 may include data specifying a time, location and name of the event, and a user viewing the web page may identify a group of invited users from the social networking system 130 via the widget 124 or by subsequently interacting with the social networking system 130. In some embodiments, the widget 124 comprises instructions that, when executed by the user device 100, generates a frame, or an iframe, within the web page 122.

The third-party website 120 sends 320 the markup language document 116 describing the generated web page 122, including the widget 124, to the user device 110 through the network 140. After receiving the markup language document 116, the browser 112 renders 325 the web page 122 based on the content and formatting instructions included in the markup language document 116. In addition to rendering 325 the web page 122, the browser 112 in the user device 110 executes the widget 124. In one embodiment, executing the widget 124 creates 330 a frame, such as an iframe, in the web page 122, so user interaction with the frame causes creation of an event within the social networking system 130 based on data from the web page 122. While described in conjunction with rendering 325 of a web page 122 from a third-party website 120, in other embodiments, the widget 124 may be rendered 325, or displayed, when a user executes or accesses an application executing on the user device 110, such as an application native to the user device 110.

In one embodiment, responsive to a user interacting with the widget 124, an event definition, based on information in the web page 122, is transmitted 340 to the social networking system 130. The social networking system 130 identifies a user profile associated with the user interacting with the widget 124 as well. For example, the social networking system 130 checks the user device 110 for a cookie identifying the user and receives the cookie, or a message associated with the cookie 114. In one embodiment, the existence of the cookie indicates whether the user of the user device 110 is a user of the social networking system 130 (e.g., whether the user has a valid account with the social networking system 130). If the user of the computing device 110 is a user of the social networking system 130, the cookie may contain information indicating whether the user is logged into the social networking system 130 (e.g., whether the user has a current valid session with the social networking system 130). In other embodiments, the user may be prompted to provide identifying information when interacting with the widget 124, with the identifying information transmitted to the social networking system along with the event description. Other suitable methods of user identification or authorization may be also be used (such as recognizing a physical token).

The social networking system 130 generates 342 an event object based on the received event definition and stores the event object in the content store 250. Creating the event object also generates a node corresponding to the event object in the social graph maintained by the social networking system 130, allowing the social networking system 130.

In one embodiment, the event object is generated 342 using a time and a location received from the web page 122 via the event description. Through interaction with the widget 124 or with the social networking system 130, a user identifies a group of social networking system users to invite to the event. This group of invited users may then be added to the event description. Additional data may be included in the event description and used when generating 342 the event. Examples of additional data include a subject, theme, one or more keywords, an activity or other suitable data.

From the event object, the social networking system 130 sends 355 invitations to the event to users in the group of users invited to the event. For purposes of illustration, FIG. 3 shows the social networking system 130 sending 355 an invitation to a user device of an invited user 302. In some embodiments, the social networking system 130 also identifies additional users to invite to the event, augmenting the group of invited users with additional users based on information stored by the social networking system 130. For example, the social networking system 130 may determine an affinity between the inviting user and uninvited users or between an invited user and uninvited users and identify additional users based on the affinity or affinities calculated. Identification of additional users to invite to an event is further described below in conjunction with FIG. 5.

Responsive to receiving an invitation to the event, an invited user sends 360 a response to the invitation to the social networking system 130. The response indicates whether the invited user will attend the event, will not attend the event or is undecided about attending the event. The social networking system 130 may distribute information about received invitation responses to entice users invited to the event but that have not responded to an invitation to attend the event. Users invited to the event but who have not responded to an invitation to the event, also referred to as "uncommitted users," are identified 365 by the social networking system 130. An affinity between an uncommitted user and a user responding it is attending the event is determined 370 and used by the social networking system to determine whether to notify the user attending the event to the uncommitted user. For example, if the affinity between the uncommitted user and the user attending the event equals or exceeds a threshold value, the social networking system 130 sends 375 a notification identifying the attending user's attendance to a user device associated with the uncommitted user 304. As another example, affinities between the uncommitted user and users attending the event are determined 370 and used to rank users attending the event. The ranking is used to identify notifications of users attending the event sent 375 to the uncommitted user. Using affinities between an uncommitted user and other users attending the event allows the social networking system 130 to notify an uncommitted user that other users having a social relationship with the uncommitted user are attending the event. This may increase the likelihood that the uncommitted user attends the event, encouraging additional interactions between social networking system users.

Figure 4:
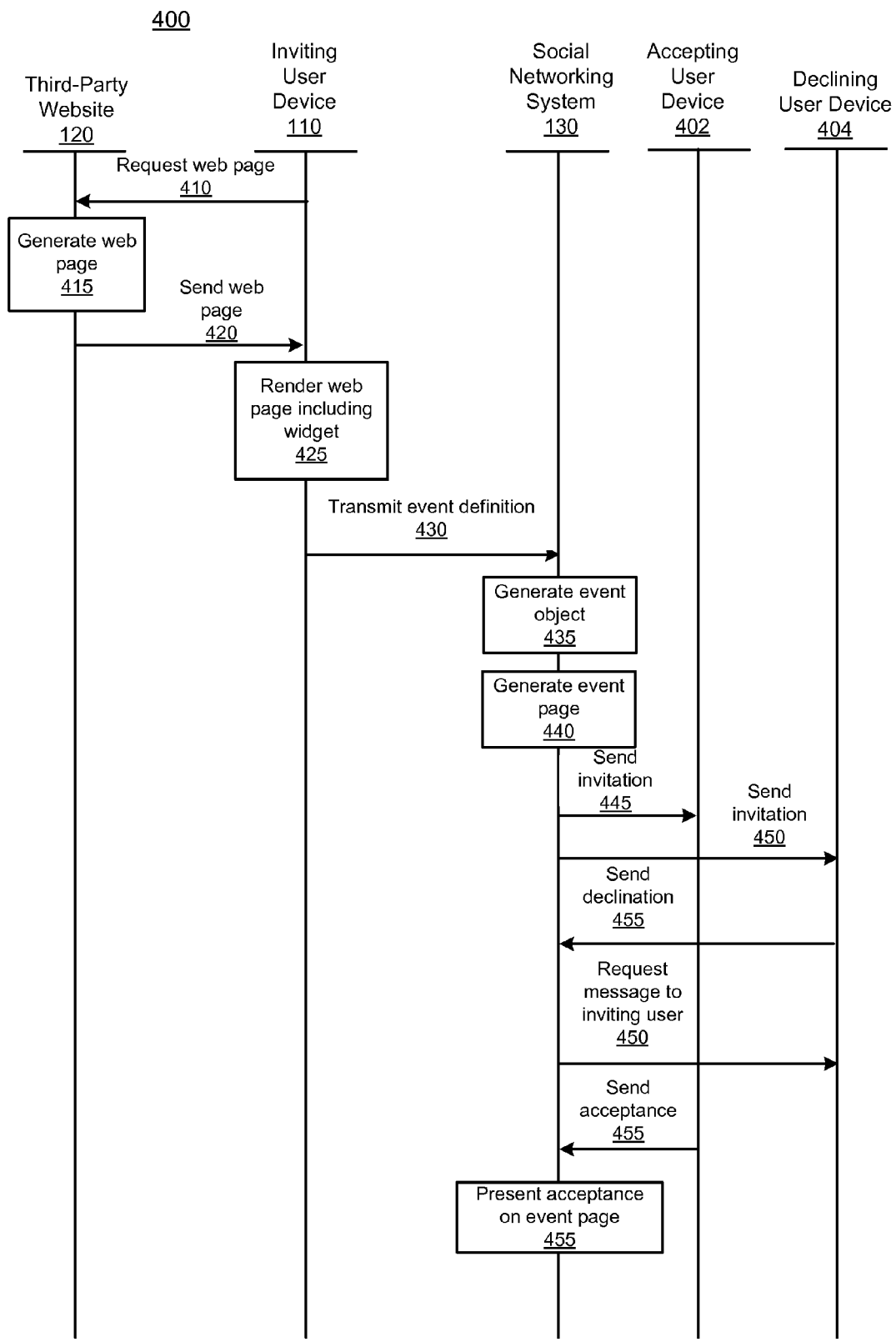
FIG. 4 is an interaction diagram of a method for identifying user attendance to an event created from a third-party website, in accordance with an embodiment of the invention.

FIG. 4 is an interaction diagram of a method 400 for identifying users attending an event created from a third-party website 130. As described above in conjunction with FIG. 3, a user inviting other users to an event (an "inviting user") requests 410, from an inviting user device 110, a web page 122 from a third-party website 120. Responsive to receiving the request, the third-party web site 120 generates 415 the web page 122 from locally stored data. For example, the third-party website 120 generates a markup language document 116 including a widget 124, as described above in conjunction with FIG. 3. As described above, the widget 124 comprises instructions that, when executed, retrieve data from the web page 122 and communicate the data to the social networking system 130. In some embodiments, the widget 124 comprises instructions that, when executed by the user device 100, generates a frame, or an iframe, within the web page 122.

The markup language document 116 including the widget 124 is sent 420 from the third-party website 120 to the inviting user device 110, which renders 325 the web page 122 from the markup language document 116. When rendering 425 the web page 122, the inviting user device 110 executes the widget 124. As described above in conjunction with FIG. 3, a browser executing on the inviting user device 110 may render 425 the web page 122 and execute the widget 124. In one embodiment, executing the widget 124 creates a frame, such as an iframe, in the web page 122, allowing the inviting user to interact with the social networking system 130 via the widget 124.

Responsive to the inviting user interacting with the widget 124, an event definition including data from the web page 122 is transmitted 430 to the social networking system 130, which generates 435 an event object based on the event definition, as described above in conjunction with FIG. 3. The social networking system 130 also identifies a user profile associated with the inviting user as described above in conjunction with FIG. 3. Generation of the event object also causes the social networking system 130 to generate a node corresponding to the event object in the social graph maintained by the social networking system 130, allowing the social networking system 130. In one embodiment, the event description used to generate 435 the event object includes a subset of a time, a location, a name and a description retrieved from the web page 122. Through interaction with the widget 124 or with the social networking system 130, a user identifies a group of social networking system users to invite to the event. This group of invited users may then be added to the event description. As described below in conjunction with FIG. 5, the social networking system 130 may also identify users to invite to the event.

In addition to generating 435 the event object, the social networking system 130 generates 440 a page associated with the event, also referred to as an "event page." Social networking system users post content associated with the event to the event page, allowing users to ascertain information about the event by viewing the event page. For example, users may post comments or images to the event page, allowing other users to readily identify content relevant to the event. The event page my also identify how users have responded to invitations to the event, allowing users to identify other users planning to attend the event by viewing the event page.

Based on the group of invited users, the social networking system 130 sends invitations to the invited users. For purposes of illustration, FIG. 4 shows the social networking system 130 sending 445 an invitation to a user device associated with a user accepting an invitation, or sending 445 an invitation to an "accepting user device 402," and sending 450 an invitation to a user device associated with a user declining an invitation, or to a "declining user device 404." In FIG. 4, the declining user device 404 sends 455 a response declining the invitation to the social networking system 130. Responsive to receiving the response declining the invitation, the social networking system 130 requests 450 a message from the declining user to the inviting user. By requesting 450 this additional communication between the declining user and the inviting user, the social networking system 130 may decrease the likelihood of users declining an invitation. In some embodiments, the social networking system 130 notifies the inviting user of the user declining the invitation or the user hosting the event but does not identify the user declining the invitation to other users invited to the event.

However, the accepting user device 402 sends 455 a response accepting the invitation to the social networking system 130, which presents 455 the acceptance on the event page. For example, a story identifying the accepting user and the acceptance of an invitation to the event is included in a news feed presented on the event page. This allows other users to more easily identify invited users attending the event, allowing users to readily identify other users attending the event when determining whether to accept an invitation.

In other embodiments, to allow users to easily join events, the third-party website 120 may provide an interface that identifies a user viewing a web page 122 (also referred to as a "viewing user") provided by the third-party website 120, as described above in conjunction with FIGS. 3 and 4, and identifies the viewing user to the social networking system 130. Based on the user profile of the viewing user, the social networking system 130 identifies other users of the social networking system 130 connected to the viewing user and determines if a user connected to the viewing user has created an event based on an event description from the web page 122. For example, the social networking system 130 determines if an event object was created by a user connected to the viewing user and determines if data used to create the event object was received from the third-party website 120, or from the web page 122.

If a user connected to the viewing user created an event based on an event description obtained from the web page 122, the social networking system 130 transmits a description of the event to the user device 110 of the viewing user for presentation to the user via the widget 124. For example, if the widget 124 comprises a frame, the description of the event is presented in the frame, allowing the viewing user to quickly identify the event. The description of the event may also include an input allowing the user to join the event from the widget 124. For example, the viewing user may join the event by interacting with an input in the widget 124 even if the viewing user has not received an invitation to the event from the user creating the event. Presentation of information received from a social networking system 130 on a web page 122 provided by a third-party website 120 is further described in U.S. patent application Ser. No. 12/764,928, filed on Apr. 21, 2010, which is hereby incorporated by reference in its entirety.

Figure 5:
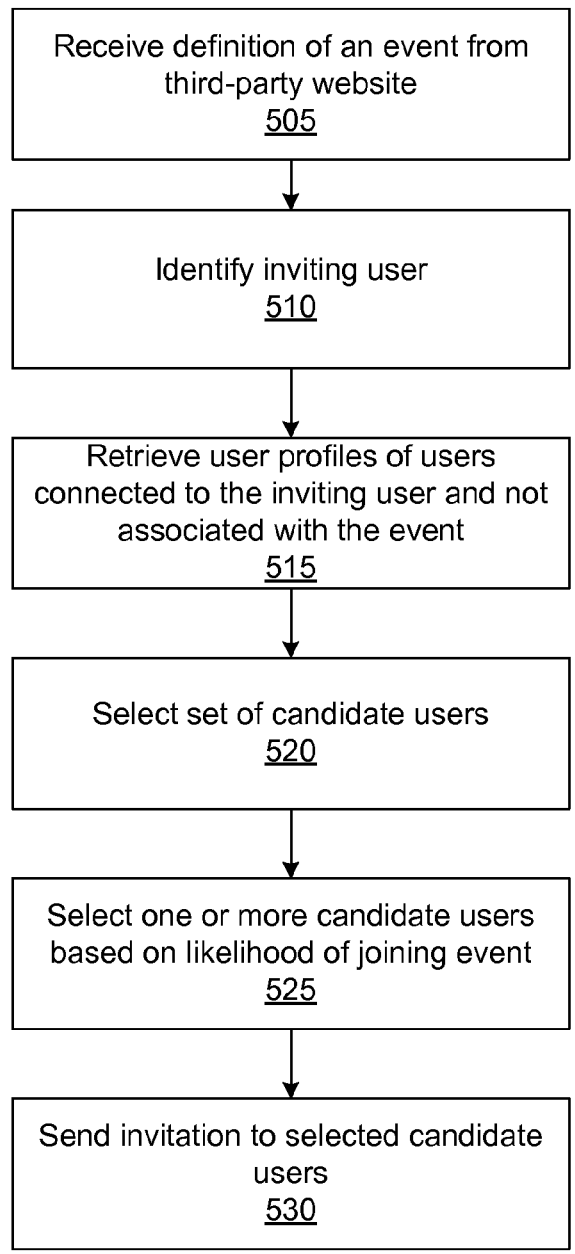
FIG. 5 is a flow chart of a method for recommending additional social networking system users to invite to an event created from a third-party website, in accordance with an embodiment of the invention.

FIG. 5 illustrates an example method 500 for recommending additional social networking system users to invite to an event created from a third-party website 120. As described above in conjunction with FIGS. 3 and 4, the social networking system 130 receives 505 a definition of an event from a web page provided by a third-party website 120, or from another system associated with a domain different than the domain of the social networking system 130 (e.g., a native application executed by a user device 110). For example an inviting user interacts with a widget included in a web page provided by a third-party website 120, causing the social networking system 130 to receive 505 a definition of an event including information from the web page. The inviting user may interact with the widget or with the social networking system 130 to include a listing of invited users to the event definition.

The social networking system 130 identifies 510 the inviting user as described above in conjunction with FIGS. 3 and 4 and retrieves 515 user profiles of social networking system users that are connected to the inviting user but are not associated with the event. For example, the social networking system 130 retrieves 515 user profiles of users connected to the inviting user but not identified by the event information. From the retrieved user profiles, the event manager 255 selects 520 a set of candidate users who are connected to the inviting user but not associated with the event.

The event manager 255 may use a variety of factors to select 520 the set of candidate users, as described above in conjunction with FIG. 2. For example, the set of candidate users includes users connected to the inviting user that are not invited to the event but are within a specified distance of the event's location or users connected to the inviting user within a specified distance of the event's location and available at the time of the event. Hence, the event manager 255 may filter the users connected to the viewing user and not invited to the event based on their proximity to the event and/or their availability at the time of the event to select 520 the set of candidate users. In other embodiments, the event manager 255 may use other attributes of the users connected to the inviting user and the event to select 520 the set of candidate users.

From the set of candidate users, the event manager 255 selects 525 one or more candidate users based on a prediction of whether each of the candidate users would join the event if notified of the event. The prediction is based on the probability, or likelihood, that a candidate user would join the event if notified of it. As described above in conjunction with FIG. 2, the event manager 255 may use a variety of factors to determine the probability that a candidate user would join an event. For example, the event manager 255 bases the prediction of a candidate user joining the event on one or more of the candidate user's affinity score for the inviting user, the candidate user's location relative to the event's location and the candidate user's availability at the time of the event. The event manager 255 may select 525 candidate users having at least a threshold probability, or likelihood, of attending the event if invited to the event. As another example, the event manager 255 determines an expected value for the candidate users based on their social value and probability of attending the event, as described above in conjunction with FIG. 2, and uses the expected value to select 525 the one or more candidate users.

In one embodiment, the social networking system 130 sends 530, to user devices 110 associated with the selected candidate users, invitations to the event and identifies the selected candidate users to the inviting user. Alternatively, the social networking system identifies the selected candidate users to the inviting user, allowing the inviting user to identify one or more of the selected candidate users to receive invitations to the event, and sends 530 invitations candidate users selected by the inviting user, allowing the inviting user greater control over the users receiving invitations to the event.

Structure and Content of a Web Page from an External Website

Figure 6:
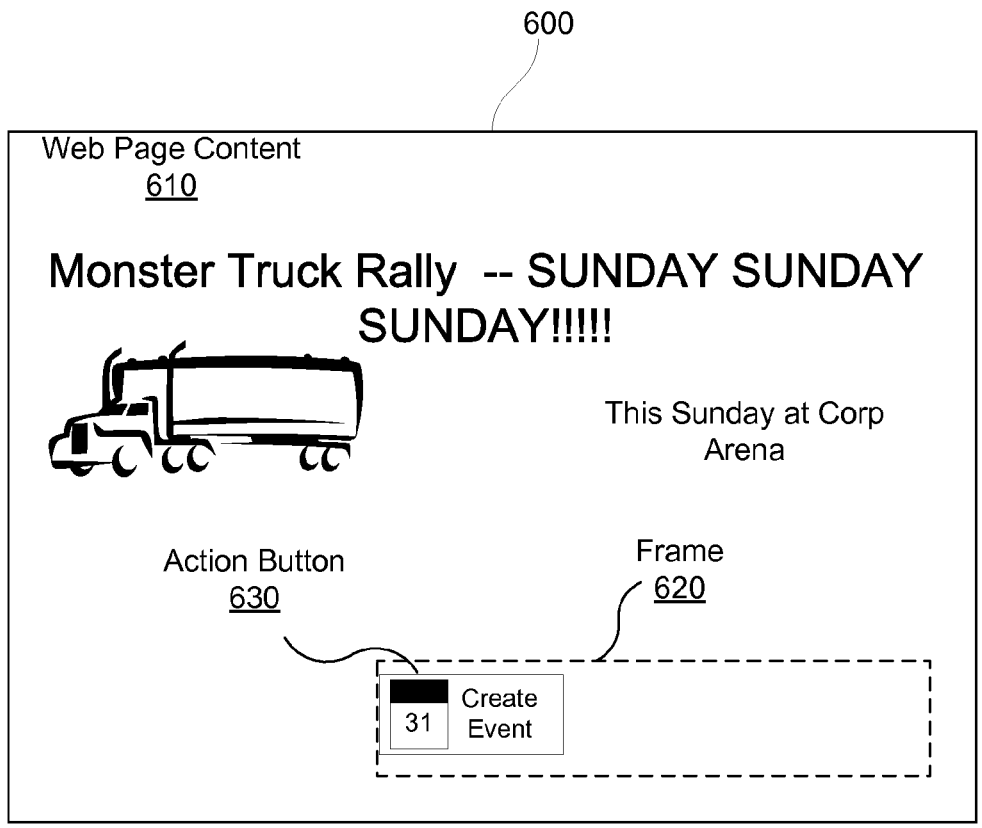
FIG. 6 is a web page of an external website including a widget for creating an event in the social networking system, in accordance with an embodiment of the invention.

FIG. 6 is one embodiment of a web page 600 of an external website 120. The web page 600 includes a frame 620 for interacting with a social networking system 130. The web page 600 includes content 610 such as text data, video data, image data or any other data for presentation using a browser application 112 operating on a user device 110. The web page 600 also includes one or more instructions describing formatting or presentation of the content 610. When a browser application 112 operating on a user device 110, executes the instructions included in the web page 600, the browser application 112 displays the identified content 610 using the format or presentation described by the web page 600.

In one embodiment, the web page 122 comprises a markup language document 116 that includes the content 610 and the instructions for formatting or presenting the content 610. In various embodiments, the markup language document 116 comprises a data file including extensible markup language (XML) data, extensible hypertext markup language (XHTML) data or other markup language data. In addition to the content 610 and instructions for formatting or presenting the content 610, the markup language document 116 comprising the web page 122 also includes one or more tags including meta-information suitable for use by the social networking system 130. For example, the tags include information describing an event associated with the content 610, such as a location associated with the event, a time associated with the event, a title of the event, a description of the event or other information describing the event. Based on information in the tags, the social networking system 130 generates an event object and a corresponding node in a social graph. Additional examples of information specified by tags include: a title, a label, a type, one or more keywords, one or more images associated with an event and one or more social networking system user identifiers associated with the event. A title tag identifies a text string to be shown when the social networking system 130 or a widget 124 accesses the node.

In the example of FIG. 6, the web page 600 also includes a frame 620 that calls a Uniform Resource Locator (URL) within a domain associated with the social networking system 130. The frame 620 is rendered by a browser application 112 operating on a user device 110 executing a widget 124 included in the markup language document 116 encoding the web page 600. The widget 124 comprises one or more instructions that, when executed by a browser application 112, generate the frame 620 within the web page 122.

In one embodiment, the frame 620 includes one or more action buttons 630, and may also include social information from the social networking system 130. For example, an action button 630 allows a user to create an event in the social networking system using information from the web page 600, such as information from one or more tags in the web page 660. Responsive to user interaction with the action button 630, information is retrieved from the web page 600 and communicated to the social networking system 130, as described above.

SUMMARY

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the invention may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A method comprising:

receiving, at a social networking system, a definition of an event based on an instruction in a markup language document presented by a user device, wherein the definition of the event is responsive to a request for a web page of a third-party website that is within a domain that is different from a domain of the social networking system;

identifying an inviting user associated with the user device;

generating an event object in the social networking system based on the definition of the event, the definition of the event identifying at least one of a description for the event, a time for the event, and a location for the event;

determining a group of one or more invited users of the social networking system;

sending an invitation to the event to one or more electronic devices associated with the invited users;

receiving a response to the invitation confirming attendance at the event from a viewing user included in the group of invited users;

identifying an uncommitted user from whom a response has not been received by the social networking system, the uncommitted user included in the group of invited users;

determining an affinity between the uncommitted user and the viewing user; and based on the affinity, sending to an electronic device associated with the uncommitted user a notification that the viewing user is attending the event.

2. The method of claim 1, wherein the definition of the event is received by the social networking system from the user device based on an interaction with the instruction in the markup language document presented by the user device.

3. The method of claim 1, wherein the definition of the event is received by the social networking system from a server associated with the third-party website based on an interaction with the instruction in the markup language document presented by the user device.

4. The method of claim 1, wherein at least one of the description for the event, the time for the event and the location for the event is retrieved from data included in the markup language document.

5. The method of claim 1, wherein sending to the electronic device associated with the uncommitted user a notification that the viewing user is attending the event comprises:

responsive to the affinity between the uncommitted user and the viewing user equaling or exceeding a threshold, sending the notification to the electronic device associated with the uncommitted user.

6. The method of claim 1, wherein determining an affinity between the uncommitted user and the viewing user comprises:

retrieving a user profile of the uncommitted user;
retrieving a user profile of the viewing user; and
determining the affinity based on the user profile of the uncommitted user and the use profile of the viewing user.

7. A method comprising:

receiving, at a social networking system, a definition of an event based on an instruction included in content provided to a user device by a third-party system that is within a domain e that is different from a domain of the social networking system;

identifying an inviting user associated with the definition of the event;

generating an event object in the social networking system based on the definition of the event, the definition of the event including at least one of: a time of the event and a location of the event;

determining one or more users of the social networking system invited to the event;

sending an invitation to the event to one or more electronic devices associated with the one or more users invited to the event;

receiving a response to the invitation confirming attendance at the event from a viewing user included in the one or more users invited to the event;

identifying an uncommitted user from whom a response has not been received by the social networking system, the uncommitted user included in the one or more users invited to the event;

determining an affinity between the uncommitted user and the viewing user; and based on the affinity, sending to an electronic device associated with the uncommitted user a notification that the viewing user is attending the event.

8. The method of claim 7, wherein the third-party system comprises an application executed by the user device.

9. The method of claim 7, wherein the definition of the event is received by the social networking system from the user device based on an interaction with the instruction.

10. The method of claim 7, wherein at least one of the time for the event and the location for the event is retrieved from the content provided to the user device by the third-party system.

11. The method of claim 7, wherein the event description further includes a description for the event.

12. The method of claim 7, wherein determining one or more users of the social networking system invited to the event comprises:

receiving a listing of users invited to the event from the inviting user.

13. The method of claim 7, further comprising:

accessing user profiles of social networking system users connected to the inviting user and not already associated with the event;

selecting a set of candidate users from the social networking system users connected to the inviting user and not already associated with the event;

selecting one or more candidate users from the set based on a prediction of whether a suggestion to invite each of the candidate users would lead to a candidate user joining the event; and sending an invitation from the social networking system to the selected one or more candidate users.

14. The method of claim 13, wherein selecting the set of candidate users from the social networking system users connected to the inviting user and not already associated with the event comprises:

selecting users connected to the inviting user and not identified by the information about the event having a location in their user profiles within a specified distance of the location included in the information about the event.

15. The method of claim 13, wherein the prediction of whether the suggestion to invite a candidate user would lead to the candidate user's joining the event is based on an affinity for the candidate user by the inviting user.

16. The method of claim 13, wherein selecting one or more candidate users from the set based on the prediction of whether the suggestion to invite each of the candidate users would lead to the candidate user's joining the event comprises:
   determining likelihoods candidate users would join the event based on an affinity for the inviting user by a candidate user and a history of the candidate user attending events that the inviting user attended; and
   selecting one or more candidate users having highest likelihoods of joining the event.

17. The method of claim 13, wherein selecting one or more candidate users from the set based on the prediction of whether the suggestion to invite each of the candidate users would lead to the candidate user's joining the event comprises:
   determining likelihoods that candidate users would join the event based on the affinity for the inviting user by a candidate user and a history of the user from the subset attending events that the inviting user attended; and
   selecting one or more candidate users having a likelihood of joining the event equaling or exceeding a threshold likelihood.

18. The method of claim 13, wherein selecting one or more candidate users from the set based on the prediction of whether the suggestion to invite each of the candidate users would lead to the candidate user's joining the event comprises:
   assigning a social value to each candidate user from the set;
   determining a probability that each candidate user from the set will join the event;
   determining an expected value for each candidate user from the set, the expected value of a candidate user based on the candidate user's social value and a probability that the candidate user will join the event;
   selecting one or more candidate users having highest expected values.

19. The method of claim 13, wherein selecting one or more candidate users from the set based on the prediction of whether the suggestion to invite each of the candidate users would lead to the candidate user's joining the event comprises:
   determining that likelihoods candidate users would join the event based on an affinity for the inviting user by a candidate user, a history of the candidate user attending events that the inviting user attended and the candidate user's location at the time included in the information about the event; and
   selecting one or more candidate users having a likelihood of joining the event equaling or exceeding a threshold likelihood.

20. A non-transitory computer-readable medium that includes instructions that, when loaded into memory, cause a processor to perform a method, the method comprising:
   receiving, at a social networking system, a definition of an event based on an instruction included in content provided to a user device by a third-party system that is within a domain that is different from a domain of the social networking system;
   identifying an inviting user associated with the definition of the event;
   generating an event object in the social networking system based on the definition of the event, the definition of the event including at least one of: a time of the event and a location of the event;
   determining one or more users of the social networking system invited to the event;
   sending an invitation to the event to one or more electronic devices associated with the one or more users invited to the event;
   receiving a response to the invitation confirming attendance at the event from a viewing user included in the one or more users invited to the event;
   identifying an uncommitted user from whom a response has not been received by the social networking system, the uncommitted user included in the one or more users invited to the event;
   determining an affinity between the uncommitted user and the viewing user; and
   based on the affinity, sending to an electronic device associated with the uncommitted user a notification that the viewing user is attending the event.

21. A system comprising:
   an application programming interface request server configured for receiving a definition of an event based on an instruction included in content provided to a user device by a third-party system that is within a domain that is different from a domain of a social networking system, the server including at least one processor and at least one memory;
   an event manager configured for:
      generating an event object in the social networking system based on the definition of the event, the definition of the event including at least one of: a time of the event and a location of the event;
      identifying, using a user profile store, an inviting user associated with the definition of the event;
      determining, using the user profile store, one or more users of the social networking system invited to the event;
      sending an invitation to the event to one or more electronic devices associated with the one or more users invited to the event;
      receiving a response to the invitation confirming attendance at the event from a viewing user included in the one or more users invited to the event;
      identifying an uncommitted user from whom a response has not been received by the social networking system, the uncommitted user included in the one or more users invited to the event;
      determining, using the user profile store, an affinity between the uncommitted user and the viewing user; and
      based on the affinity, sending to an electronic device associated with the uncommitted user a notification that the viewing user is attending the event.

* * * * *

UNITED STATES PATENT AND TRADEMARK OFFICE
CERTIFICATE OF CORRECTION

PATENT NO. : 9,021,034 B2
APPLICATION NO. : 13/544166
DATED : April 28, 2015
INVENTOR(S) : Srinivas P. Narayanan et al.

It is certified that error appears in the above-identified patent and that said Letters Patent is hereby corrected as shown below:

In the Claims

Column 22, line 2, after "domain", delete "e".

Signed and Sealed this
First Day of March, 2016

Michelle K. Lee
*Director of the United States Patent and Trademark Office*